(12) United States Patent
Ritter

(10) Patent No.: US 6,289,221 B1
(45) Date of Patent: Sep. 11, 2001

(54) MOBILE RADIO TELEPHONE SYSTEM

(75) Inventor: Gerhard Ritter, Thaining (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/009,899

(22) Filed: Jan. 20, 1998

(51) Int. Cl.[7] .................................................. H04Q 7/20
(52) U.S. Cl. ........................... 455/447; 455/450; 455/562
(58) Field of Search .................................. 455/447, 448, 455/449, 450, 454, 561, 562, 446, 464, 552, 553

(56) References Cited

U.S. PATENT DOCUMENTS

| | | | |
|---|---|---|---|
| 4,972,456 | * 11/1990 | Kaczmarek et al. | 379/59 |
| 5,355,367 | * 10/1994 | Comroe et al. | 370/95.1 |
| 5,671,219 | * 9/1997 | Jensen et al. | 455/69 |
| 5,781,865 | * 7/1998 | Gammon | 455/561 |
| 5,802,474 | * 9/1998 | Faruque | 455/447 |
| 5,894,473 | * 3/1999 | Dent | 370/342 |
| 5,901,145 | * 5/1999 | Sawyer | 370/332 |
| 6,104,930 | * 8/2000 | Ward et al. | 455/450 |

* cited by examiner

Primary Examiner—William Trost
Assistant Examiner—Tilahun Gesesse
(74) Attorney, Agent, or Firm—Schiff Hardin & Waite

(57) ABSTRACT

A mobile radio telephone system comprises a plurality of operatively coupled base stations, having first and second radio communications apparatus which operate to effect radio communications with at least one mobile station via first and second radio signals with radio frequencies which occupy common parts of the radio frequency spectrum, wherein a frequency re-use pattern associated with the first radio communications apparatus is substantially matched to a frequency re-use pattern associated with the second radio communications apparatus.

23 Claims, 6 Drawing Sheets

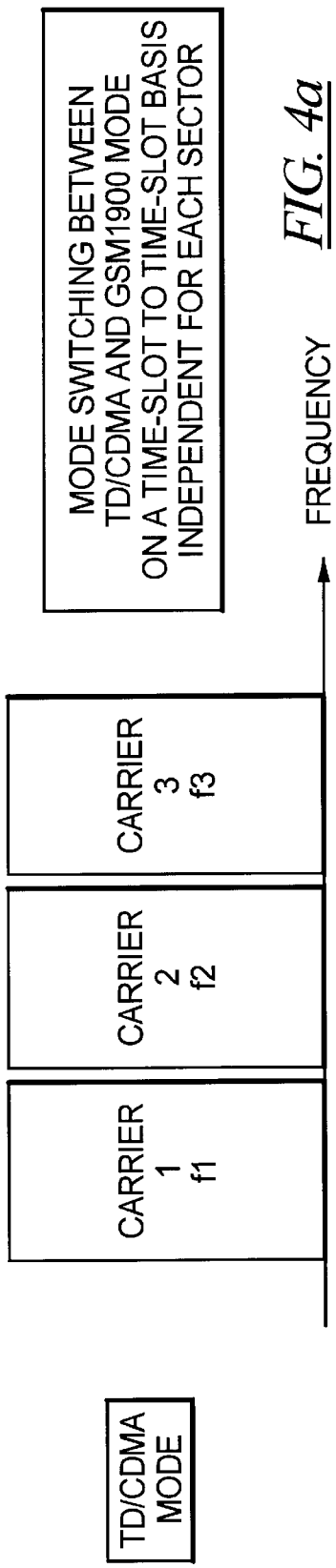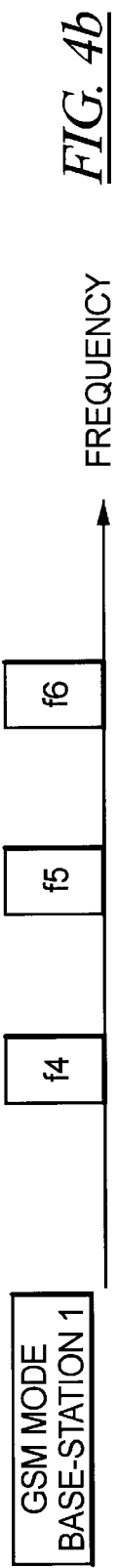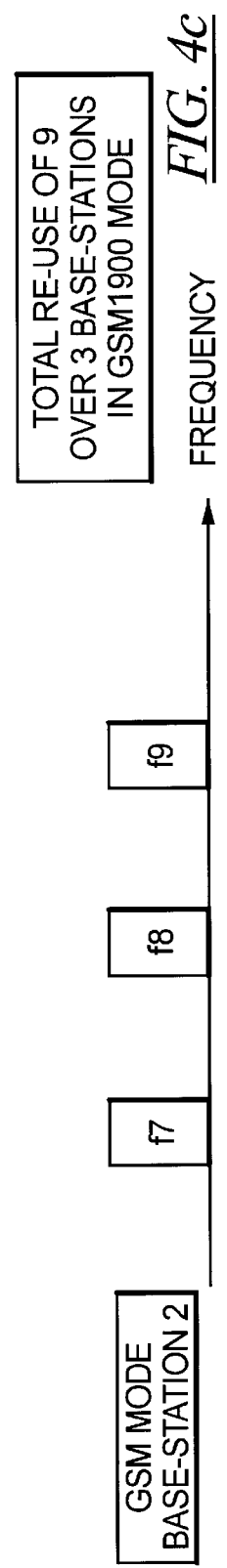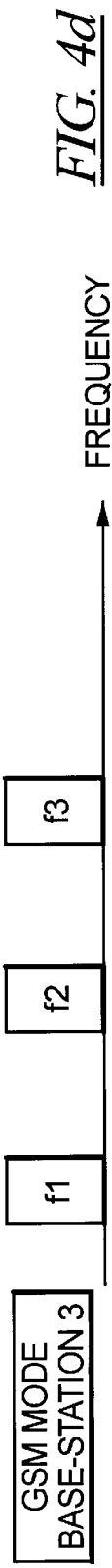
FIG. 4a
FIG. 4b
FIG. 4c
FIG. 4d

*FIG. 6*

| PARAMETER | VALUE |
|---|---|
| CARRIER BANDWIDTH | 512 kbps |
| CARRIER BANDWIDTH (HOT SPOTS) | 1024 kbps |
| MAX. USER DATA RATE | 512 kbps |
| MAX. USER DATA RATE (HOT SPOTS) | 1024 kbps |
| MAX. USER DATA RATE (LOW COST) | 128/128 kbps SYMMETRIC |
| MAX. USER DATA RATE (LOW COST) | 196/64 kbps SYMMETRIC |
| MIN. SPECTRUM REQUIREMENT | 2.2 Mhz INCLUDING GUARDBAND |
| SPEECH CODER | 13 kbps, AMR, EFR, FR, HR (GSM) |
| SPEECH CODER FRAME DURATION | 20 msec |
| INTERLEAVING | 8 HALF-BURSTS (FR AND HR) |
| CODES PER TIME SLOT | 2 CODES FOR FR, 1 CODE FOR HR |

TABLE 1: OPERATING PARAMETERS FOR A DUAL MODE MOBILE RADIO SYSTEM

| $n$ | $R$ | GSM RE-USE (WITH TD/CDMA RE-USE = 3) | GSM RE-USE (WITH TD/CDMA RE-USE = 4) |
|---|---|---|---|
| 1 | 6 | (18) | (24) |
| 2 | 3 | 9 | 12 |
| 3 | 2 | 6 | 8 |

TABLE 2: POSSIBLE RE-USE CLUSTER FOR A TD/CDMA BANDWIDTH OF 1.2 Mhz.

FIG. 7

| n | R | GSM RE-USE (WITH TD/CDMA RE-USE = 3) | GSM RE-USE (WITH TD/CDMA RE-USE = 4) |
|---|---|---|---|
| 1 | 12 | (36) | (48) |
| 2 | 6 | (18) | (24) |
| 3 | 4 | 12 | 16 |
| 4 | 3 | 9 | 12 |
| 6 | 2 | 6 | 8 |

TABLE 3: POSSIBLE RE-USE CLUSTERS FOR A TD/CDMA BANDWIDTH OF 2.4 MHz.

MOBILE RADIO TELEPHONE SYSTEM

BACKGROUND OF THE INVENTION

1. Field of the Invention

The present invention relates to mobile radio telephone systems and methods for operating mobile radio telephone systems.

2. Description of the Related Art

Mobile radio telephone systems serve to provide mobile units with a means for communicating data via radio signals while the mobile units move within the mobile radio system. To this end, mobile radio systems are provided, inter alia, with a plurality of interconnected base stations which form a mobile radio network.

In order to make optimum use of a portion of radio frequency spectrum allocated to a mobile radio system, the mobile radio system is provided with means to maximize a number of data communications channels which may be contemporaneously supported within a given radio coverage area. The data communications channels may, for example, carry data representative of speech signals forming part of a telephone conversation. Data is communicated between the mobile and the base station by modulating radio signals formed from electromagnetic waves having a high frequency which serve to carry the data between mobile stations and the base stations. The radio signals modulated by the data are known as carrier signals, and the frequency of the carrier signals is known as the carrier frequency. Each carrier signal has a radio frequency bandwidth centered around the carrier frequency, which therefore occupies part of the radio frequency spectrum allocated to the mobile telephone system. A portion of the radio frequency spectrum allocated to the mobile radio telephone system is therefore occupied by a plurality of carrier signals, each carrier signal forming a communications channel.

In order to make optimum use, therefore, of the allocated radio frequency spectrum, mobile radiotelephone systems are arranged to re-use communications channels formed by the radio frequency carrier signals by assigning the same carrier frequencies to different base stations within the system, and thereby re-using the carrier frequencies. Although this results in co-channel interference being generated at each base station, this interference may be reduced to a tolerable level by arranging for base stations using the same carrier frequencies to be separated from each other by as large a distance as possible. This is facilitated by a reduction in signal strength in proportion to the distance traveled by the radio signals, in accordance with the natural laws of propagation.

The term co-channel interference as used herein refers to an amount of unwanted signal power generated by a mobile or a base station within the mobile radio system on the same reallocated carrier frequency at a receiver operating to detect wanted signals at another base station or mobile station. Co-channel interference has the effect of reducing the integrity of the communicated data.

An example of a mobile radio system is the Global System for Mobiles (GSM) which has become widely adopted throughout the world. For example, in Europe, over 20 million people are known to use the GSM system or a similar derivative of the GSM system which is known as DCS 1800. In order to effect a frequency re-use, operators of the GSM system deploy base stations in order to effect a radio coverage over a certain geographical location and allocate to those base stations carrier frequencies in accordance with a frequency re-use pattern.

A frequency re-use pattern is known to those skilled in the art as being an arrangement wherein a plurality of carrier frequencies are allocated to a plurality of base stations in accordance with a predetermined pattern which pattern is thereafter repeated for other base stations within the system.

A geographical area associated with a base station within which a mobile station can effect communication of data via radio signals with the base station, in preference to another base station is known as a cell. The frequency re-use pattern may therefore be viewed as forming a plurality of cell clusters, each cluster having the same set of carrier frequencies, but each call or each sector of the cell in the cluster being allocated different carrier frequencies.

A sectored cell is formed using directional antennas which serve to further divide a cell into a plurality of parts known as sectors, to which different carrier frequencies may be assigned. Therefore, a mapping of the frequency re-use pattern of the mobile radio system onto cells or cell sectors will result in an associated cluster, the size of the cluster corresponding to the number of separate sectors or cells onto which the set of carrier frequencies re-used in accordance with the frequency re-use pattern is mapped.

The term cluster size as used herein therefore refers to and includes a number of sectors or cells onto which the set of carrier frequencies formed are mapped in accordance with the frequency re-use pattern.

As will be appreciated, the cluster size is determined in accordance with the number of radio frequency carriers available to the mobile radio telephone system in combination with an amount of co-channel interference which can be tolerated by the radio communications apparatus, while maintaining an acceptable integrity of the communicated data. The capacity of the mobile radio communications system, in terms of the number of data communications channels which can be contemporaneously supported within a geographical area and within a given portion of radio frequency spectrum, can therefore be seen to increase, both as the size of the cell cluster reduces and as the geographical area associated with a cell is reduced. For example, operators of the GSM system are known to use a cluster size of nine.

The GSM system is a second generation mobile radio system which employs a time division multiple access technique, which serves to support a plurality of data channels contemporaneously. However, it is known that third generation mobile radio systems will supercede the second generation mobile radio systems and provide advantages associated with an increase in variety of data types which may be communicated over the mobile radio system, and which will provide an increase in capacity which the system can support.

Considerable investment has been made by operators in procuring and deploying second generation mobile radio systems, and in particular, the operators of the GSM, DCS 1800 and GSM 1900 systems. Providing a mobile radio system with a means for combining different radio communications apparatus, within an allocated radio frequency spectrum represents a technical problem which is addressed by the present invention.

SUMMARY OF THE INVENTION

According to the present invention, a mobile radio telephone system comprises a plurality of operatively coupled base stations, which are provided with first and second radio communications apparatus that operate to effect radio communications with at least one mobile station via at least one of first and second radio signals having radio frequencies which occupy a common part of the radio frequency spectrum. A first frequency re-use pattern associated with said first radio communications apparatus is substantially matched to a second frequency re-use pattern associated with said second radio communications apparatus.

A cluster size associated with the first frequency re-use pattern of the first communications apparatus may correspond to a cluster size associated with the second frequency re-use pattern associated with the second communications apparatus scaled by a predetermined factor, thereby effecting the substantial match between the first and second re-use patterns. The predetermined factor may be an integer.

By arranging for a cluster size associated with a first radio communications apparatus embodied within the base stations of a mobile radio system to be a multiple of a cluster size associated with a second radio communications apparatus also embodied within the base stations of the mobile radio system, the frequency re-use patterns associated with the first and second radio communications apparatus may be integrated together, within a portion of the radio frequency spectrum already allocated to a mobile radio system communicating with the first communications apparatus.

A limit on a minimum separation of base stations which are operating with the same carrier frequency is determined, inter alia, by an amount of co-channel interference which may be tolerated by the radio communications apparatus.

Advantageously the second radio communications apparatus may have a different tolerance to co-channel interference than the first radio communications apparatus.

By providing a second communications apparatus which is able to tolerate a greater amount of co-channel interference, a cluster size of the re-use pattern associated with the second radio communications apparatus may be reduced in comparison to a cluster size of the re-use pattern associated with the first radio communications apparatus, thereby facilitating a match between the first and the second reuse patterns.

Advantageously a bandwidth of the second radio frequency signals may be greater than a bandwidth of the first radio signals.

As a result of the bandwidth of the first radio signals being smaller than the bandwidth of the second radio signals, an amount of co-channel interference experienced at a receiver embodied within the first radio communications apparatus caused by the second radio signals is reduced in proportion to the ratio of the bandwidth of the second radio signals to the bandwidth of the first radio signals. An effect of this reduction is that the first and second radio communications apparatus may be operated contemporaneously within the mobile radio system without the second radio signals causing an undue amount of co-channel interference at a receiver for the first radio communications. Similarly, the first radio signals will not cause an undue amount of co-channel interference at a receiver for the second radio signals. As a result, an operator of a mobile radio system arranged to effect communications with mobiles according to the first communications apparatus may provide a gradual transition to a system providing communications according to the second communications apparatus, without providing mobile units which must operate in accordance with both the first and the second communications apparatus. Furthermore, switching communications to mobile units using either the first or the second radio communications apparatus may be affected on a time slot to time slot basis.

The first radio communication apparatus may operate in accordance with a second generation mobile radio system such as GSM, DCS 1800, DCS 1900 or the like. The second radio communications apparatus may operate in accordance with a code division multiple access system. The code division multiple access system may be a time division/code division multiple access system.

Advantageously the base stations may include directional antennas which serve to divide each cell into a plurality of sectors wherein different carrier frequencies are allocated to different sectors for both the first and the second radio communications apparatus.

According to one aspect of the present invention, a method of combining first and second radio communications apparatus in a mobile radio system, comprises the steps of:

allocating carrier frequencies in accordance with a first frequency re-use pattern associated with the first radio communications apparatus to a plurality of base stations; and matching carrier frequencies in accordance with a second frequency re-use pattern associated with the second communications apparatus with the first frequency re-use pattern.

The method of combining first and second radio communications apparatus, may further comprise the step of arranging for a cluster size associated with the first frequency re-use pattern to be a multiple of a cluster size associated with the second frequency re-use pattern.

DESCRIPTION OF THE DRAWINGS

FIG. 4 is a diagram illustrating a frequency plan within the dual mode mobile radio system illustrated in FIG. 1;

FIG. 6 are tables which illustrate operating parameters and possible re-use clusters;

FIG. 7 is a table which illustrates possible re-use clusters.

DESCRIPTION OF THE PREFERRED EMBODIMENTS

An exemplary embodiment of the present invention will be described with reference to a GSM 1900 mobile radio communication system in combination with a Time Division/Code Division Multiple Access system (TD/CDMA). The GSM 1900 System is a derivative of the GSM system used in North America. As is known to those skilled in the art, the GSM system is a Time Division Multiple Access system and as such is arranged to be provided with a plurality of relatively narrow bandwidth radio frequency channels through which digital information modulated onto carrier frequencies are communicated between base and mobile stations. The GSM system is a frequency division duplex system in that communication on the up-link between the mobile station and the base station is on a separate frequency channel to communications from the base station to the mobile station that is on the down-link. The bandwidth of radio frequency of a GSM communications channel is known to be in the order of 200 khz.

A third generation type mobile radio communication system which is provided with a means for carrying a variety of different types of data and has an improved capacity in comparison to second generation mobile radio systems such as GSM is known as Time Division/Code Division Multiple Access (TD/CDMA) and can be described as a hybrid system between TDMA and CDMA. The means by which data is modulated on to radio signals and communicated using the TD/CDMA system is described in an article entitled "Performance of a Cellular Hybrid C-TDMA Mobile Radio System Applying Joint Detection and Coherent Receiver Antenna Diversity" by G. Blanz, A. Klein, M. NaBhan and A. Steil published in the IEEE Journal on Selected Areas in Communications, Volume 12, no. 4, May 1994 at page 568.

The TD/CDMA system is characterized in that each of a plurality of communications channels is provided with a user specific sequence code which is modulated by the data thereby spreading the spectrum of data communicated on that channel, and in that information communicated on each radio frequency carrier is arranged to be divided into a number of time intervals.

Data modulated on to a user specific sequence code is transmitted in one of the time slots of the radio frequency carrier, with a plurality of user specific sequences being assigned to each time slot. As a result, a TD/CDMA system is provided with a greater resistance to co-channel interference.

However, as a result of the increase in the spectrum of the modulated data, a bandwidth of the resulting radio frequency signal is greater than that of a TDMA signal of the GSM system. Nevertheless, the bandwidth of a carrier signal of a TD/CMA signal is substantially less than that of a direct sequence spread spectrum CDMA system in which a length of the spreading code requires a bandwidth which is substantially greater than that of TD/CDMA, and furthermore generates signals which have a greater temporal length inhibiting time division of the carrier signal.

Figure 1:
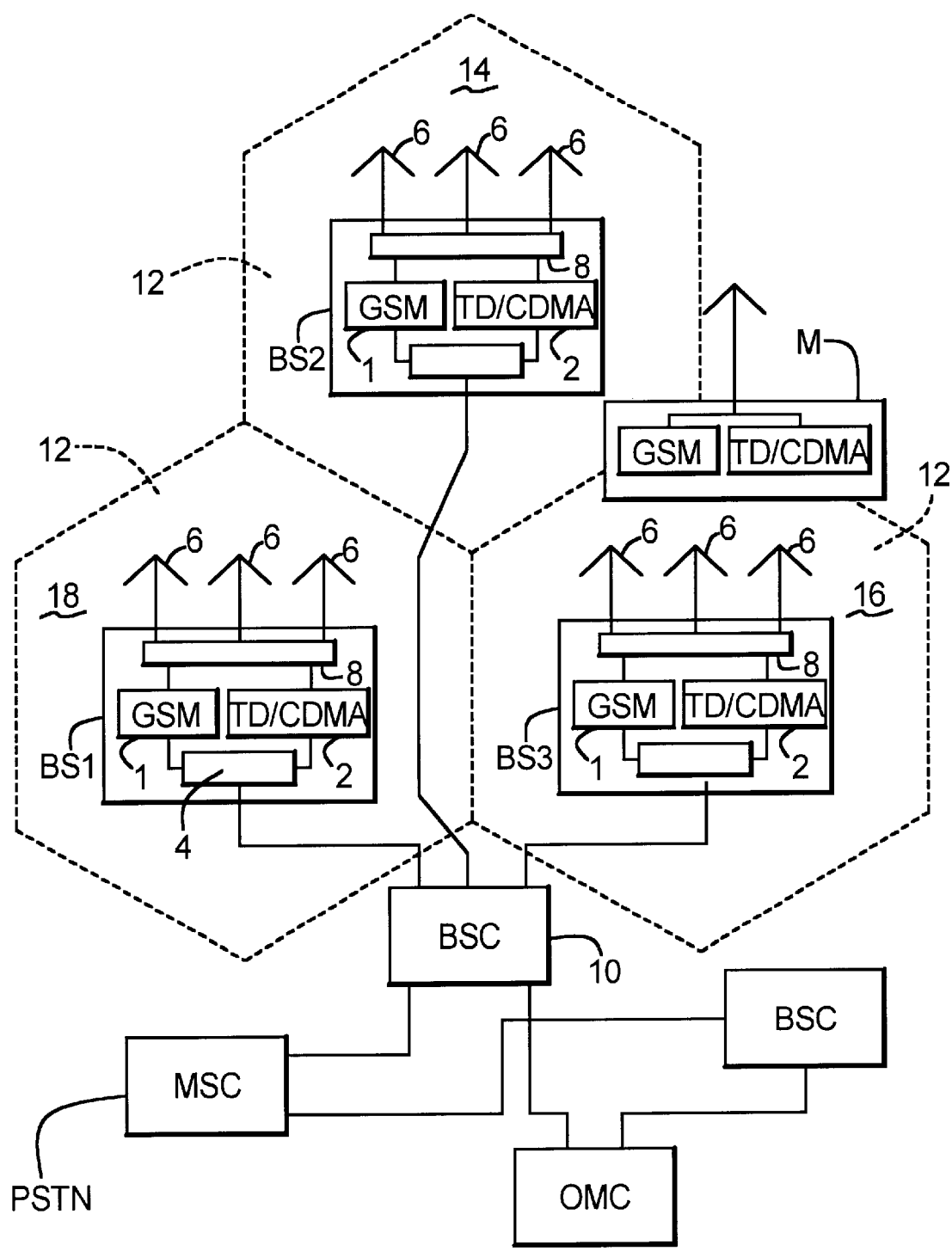
FIG. 1 is a schematic block diagram illustration of a dual mode mobile radio telephone system which supports a GSM and a TD/CDMA system.

A dual mode mobile radio telephone system formed from a GSM system in combination with a TD/CDMA system is shown in FIG. 1. In FIG. 1 three base stations BS1, BS2, BS3, are shown to be comprised of a GSM communications unit 1, and a TD/CDMA communications unit 2, connected to a data processing unit 4. Data to be communicated by the base station is fed from either the GSM communications unit 1, or the TD/CDMA communications unit 2, to either of three directional antennas 6, via an antenna coupling means 8. Data is communicated between a mobile station M, roaming within the mobile radio network and a Base Station BS2, with which the mobile station is affiliated, by either the GSM communications unit 1 or the TD/CDMA communications unit 2 via radio signals modulated in accordance with either of these two systems.

The data is fed to and from a Base Station Controller BSC 10, to the base station BS2, with which the mobile unit M is affiliated. Thereafter, the data is conveyed to and from a Mobile Switching Center (MSC) from the Base Station Controller BSC 10, to which a plurality of base stations BS1, BS3, including the base station BS2 are connected.

The Mobile Switching Center MSC, forms a connection to the Public Switched Telephone Network PSTN. Also shown in FIG. 1 is an Operations and Maintenance Center OMC, which is connected to each of the Base Station Controllers BSC, through which control of the mobile radio network is effected. As will be appreciated by those skilled in the art the MSC, BSC, OMC and Base Stations BS1, BS2, BS3, substantially form part of a mobile radio network in accordance with the GSM system. However, in addition to those parts corresponding to the GSM system, the TD/CDMA communications units 2, are also embodied within each of the base stations and through which data may be communicated with the mobile station M correspondingly adapted to detect data communicated by a TD/CDMA system.

Each base station within the mobile radio system is arranged to form a radio communications link with a mobile station within a geographical area loosely assigned to the base station. Such an area is shown in FIG. 1 with the boundaries illustrated by dashed lines 12. The boundaries illustrated by the dashed line 12 form a cell with which the base station is associated. Thus the base stations BS1, BS2, BS3, are correspondingly associated with the cells 14, 16, 18. Each cell within the mobile radio system is allocated at least one radio frequency carrier for each of the up-link and for the down-link. Furthermore as illustrated by the present exemplary embodiment, the directional antennas 6, serve to divide the cell into a plurality of sectors to which at least one radio frequency carrier is allocated.

As already described, each base station is assigned at least one different radio frequency carrier within a frequency re-use pattern such that a group of cells or a group of cell sectors forms a cluster in which each cell, or cell sector has a different carrier or plurality of different carriers. Thereafter in accordance with the frequency re-use pattern the cluster is repeated for the other base stations throughout the network.

As will be appreciated however with such a third generation mobile radio system, a completely different frequency re-use pattern may result, and as such may be incompatible with frequency planning established for the GSM system. However, as illustrated by the embodiment of the present invention, with a third generation system such as TD/CDMA, a frequency re-use pattern of the TD/CDMA system may be matched to that of the GSM system with the effect that the dual mode mobile radio network may communicate with a mobile using the GSM communications unit or the TD/CDMA communications unit, with both the resulting frequency re-use plans and the spectral use substantially matched. As such, a cluster of cells may operate in either a mode in which communication is affected via the GSM communications unit 1, or via the TD/CDMA communication unit 2, or indeed both systems may be active contemporaneously, with communications with different mobiles being effected on different time slots. This is illustrated with reference to a frequency plan shown in FIG. 2, where parts also appearing in FIG. 1 bear identical numerical designations.

Figure 2:
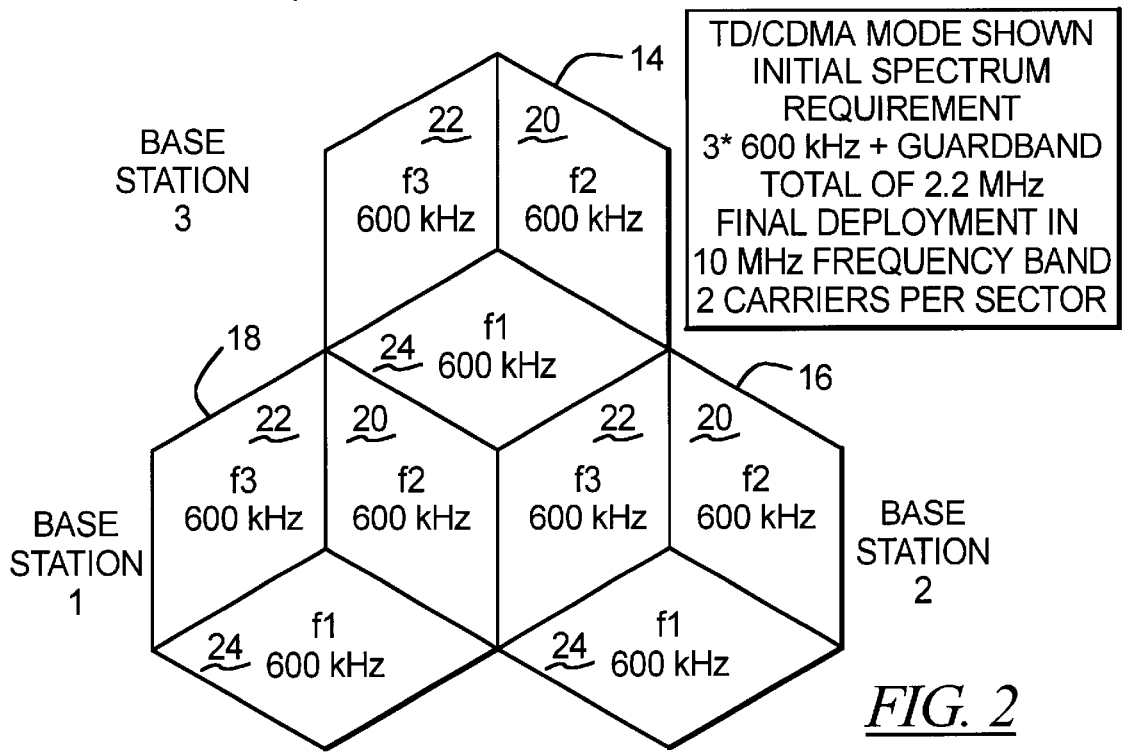
FIG. 2 is a diagram illustrating a cluster of cells associated with a first frequency re-use pattern.

FIG. 2 illustrates a frequency plan associated with the mobile radio system illustrated in FIG. 1 for a sectored cell arrangement. As illustrated in FIG. 2 each of the cells 14, 16, 18 is provided with a sector 20, 22, 24 created by the directional antennas 6 illustrated in the diagram in FIG. 1. The frequency re-use pattern illustrated in FIG. 2 is formed by the base stations shown in FIG. 1 which are operating with the TD/CDMA communications units 2 shown in FIG. 1. As such, each of the sectors 20, 22, 24, of the cells 14, 16, 18, is allocated one of three radio frequency channels via which TD/CDMA signals are communicated. Each sector 14, 16, 18, of the cell is allocated a separate TD/CDMA radio frequency channel designated f1, f2, f3. As illustrated in FIG. 2 the bandwidth of each of the radio frequency channels for the TD/CDMA system is 600 khz so that the total spectral occupancy of a TD/CDMA cell including guard band is in the order of 2.2 MHz. The re-use cluster size in this case is three. The use of sectored cells in this example produces an arrangement in which the re-use pattern is formed into a single cell.

Figure 3:
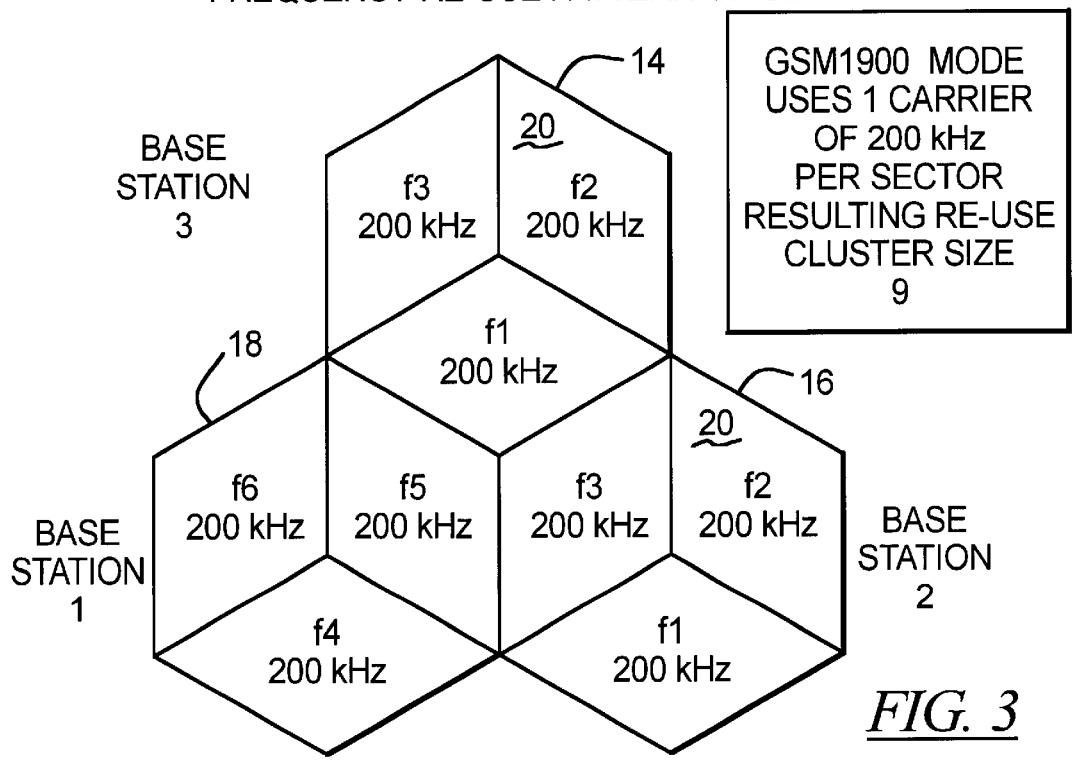
FIG. 3 is a diagram illustrating a cluster of cells associated with a second frequency re-use pattern.

Correspondingly, a frequency plan for the mobile radio system illustrated in FIG. 1, providing communication of data via the GSM communications units 1, is shown in FIG. 3. As illustrated in FIG. 3, for the GSM frequency re-use pattern, each sector of the cells 14, 16, 18, is allocated a separate radio frequency channel as for the case with the TD/CDMA shown in FIG. 2. However as a result of a reduction in resistance to co-channel interference associated with the GSM system, or in other words a requirement for a greater wanted signal strength to unwanted signal strength ratio associated with co-channel interference, each of the sectors associated with the cells 14, 16, 18 is allocated one of nine radio frequency channels designated f1, f2, f3, f4, f5 f6, f7, f8. As illustrated in FIG. 3 in correspondence with the narrow band operation of the GSM systems the bandwidth of the GSM system is only in the order of 200 khz. As afforded by this example, the directional antennas serve to divide the cell into three sectors so that with a cluster size of nine, only three cells are used.

As will be appreciated from the aforementioned description of an exemplified embodiment of the present invention, such a combination of a GSM 1900 system with a TD/CDMA system serves to provide a bandwidth efficient combination of second and third generation mobile radio systems. As such and as illustrated by the embodiment of the present invention, a cluster size of the frequency re-use pattern associated with the GSM system is nine whereas a cluster size of the TD/CDMA system is three, which provides a substantially efficient match of frequency plans associated with the two systems. Furthermore as illustrated by the present invention, a total spectral occupation of each re-use cluster for the cells 14, 16, 18, is substantially the same being; 9×200 khz=1800 khz for GSM; and 3×600 khz =1800 khz in the case of TD/CDMA. This compatible combination of two systems serves to provide a mobile radio operator with an efficient match of radio frequency spectrum and furthermore allows a smooth transition between second generation and third generation mobile radio systems. Furthermore, as aforementioned the transition may be effected from sector to sector, cell to call, and from time slot to time slot.

As will be appreciated a corresponding arrangement of the mixture between TD/CDMA and GSM frequency re-use patterns could equally be effected without a sectored cell arrangement with omni-directional antennas instead of directional antennas. However, in a case where a single TD/CDMA carrier is allocated to each cell, and correspondingly a GSM radio frequency carrier is allocated to each cell, the frequency re-use pattern for the GSM system would occupy nine cells whereas the TD/CDMA system would consist of three cells.

A further illustration of the allocation of carrier frequencies resulting from respective frequency re-use patterns associated with the TD/CDMA and GSM 1900 system is illustrated in FIG. 4. In FIG. 4a the radio frequency spectrum occupied by each of the three carriers used for the TD/CDMA system is illustrated. Correspondingly in FIGS. 4b, 4c and 4d, the spectral bandwidth associated with the nine carrier frequencies, three of which are allocated to each of the three base stations may be seen.

Figure 5A:
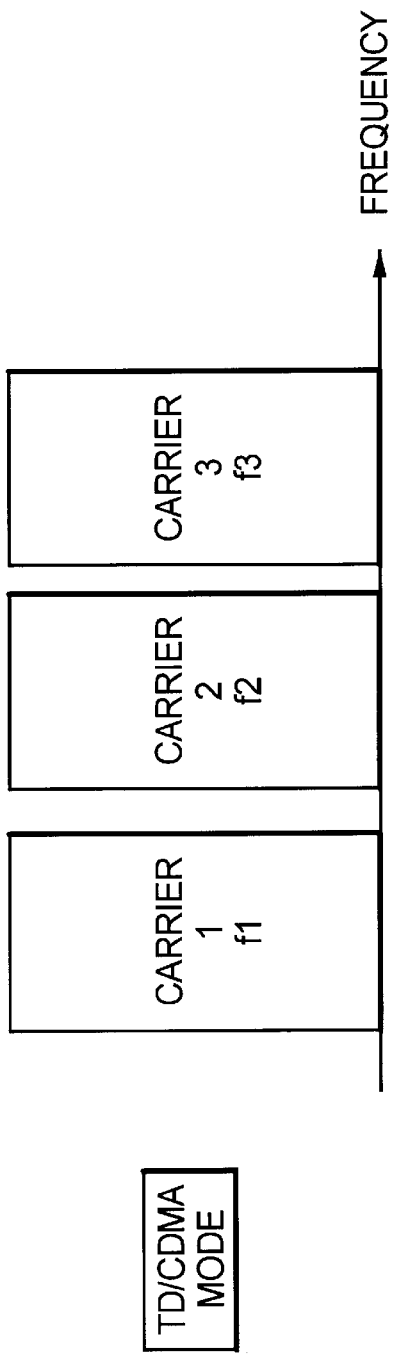
FIG. 5 is a further diagram illustrating a further frequency plan associated with the dual mode mobile radio system illustrated FIG. 1.
Figure 5B:
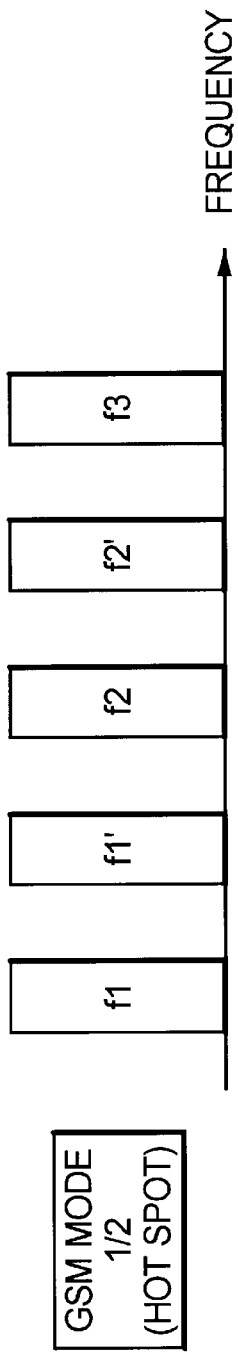

A further enhancement to the embodiment of the present invention is illustrated in FIG. 5. In FIG. 5 the frequency spectrum associated with the TD/CDMA carriers f1, f2 and f3 are shown in FIG. 5a. In FIG. 5b, a frequency spectrum associated with a base station communicating via the GSM system is illustrated, In this configuration two carrier frequencies are assigned to each of the cell sectors, to provide an increase in the capacity provided by the base station, for a case where the base station is operating in a "hot spot" in which an increase in capacity is required.

Figure 5C:
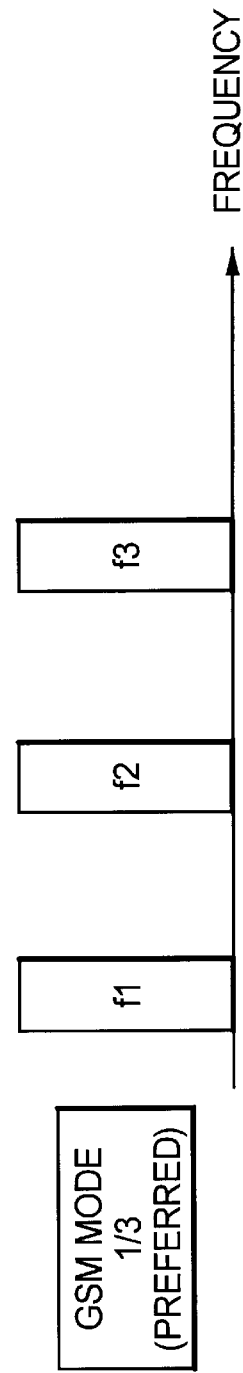

As will be appreciated however a corresponding increase in co-channel interference can be expected with this configuration and therefore it is likely that this configuration would only be used in an area where substantial radio frequency shielding could be provided by buildings or natural barriers which could facilitate an increase in the number of carriers per sector. This would, for example, be possible in a "Manhatten type" environment. FIG. 5c provides a frequency spectrum for a base station having a single carrier per sector.

In table 1 of the attached Figures further information is provided illustrating possible system parameters which may be used with the illustrative embodiment of the present invention. The co-existence of a GSM 1900 mode system in combination with a TD/CDMA system is facilitated by use of a mobile system in which the base stations are not synchronized. This is one advantage of the TD/CDMA system, in comparison with other third generation systems which operate in accordance with a direct sequence CDMA system, which requires base stations to be synchronized in order to ensure orthogonality between spreading codes.

The aforementioned embodiment of the present invention can be seen to facilitate re-allocation and deployment of a radio frequency spectrum allocated to an operator of a mobile radio telephone system. As such, an Operation and Maintenance Center OMC, as illustrated in FIG. 1 can be used to facilitate switching base stations between TD/CDMA mode and GSM 1900 mode. As aforementioned, the frequency re-use associated with a GSM 1900 system in combination with TD/CDMA, system can be compared in that TD/CDMA system uses one carrier of 600 khz per sector of a cell providing a frequency re-use of three. In comparison, the GSM system uses one 200 khz carriers per sector with offset frequencies of 0, −200 and +200 khz creating a frequency re-use of nine.

As will be appreciated radio communications with mobile units using a dual mode mobile radio system as herein before described, may be changed from the TD/CDMA system and the GSM system from time slot to time slot. The TD/CDMA system provides a means for communications with three or four mobiles per time slot, whereas only a single mobile is supported per time slot by the GSM system.

As a result of the bandwidth of the TD/CDMA radio signals being three times larger than that of the GSM radio signals, co-channel interference generated by the TD/CDMA signals within the frequency band of the GSM signals at a receiver forming part of the GSM communications unit will be correspondingly reduced by one third of that which is generated at a receiver for the TD/CDMA signals. This results in co-channel interference at receivers of the GSM 1900 communications units being about 5 dB lower than that generated by TD/CDMA signals as a result of a lower bandwidth of the GSM 1900 system (200 khz compared with 600 khz). Alternatively, the co-channel interference from the GSM 1900 signals caused at a receiver for TD/CDMA signals is low as a result of only one mobile unit being permitted to transmit in a time slot on a GSM 1900 carrier. It is this correspondence of the co-channel interference generated which provides a match between the GSM 1900 system and TD/CDMA system. As a result, an interworking of the GSM 1900 and TD/CDMA system is provided, to the effect that base stations of the frequency re-use cluster may provide communications using either the GSM communications apparatus or the TD/CDMA communications apparatus. As such, a substantial advantage is afforded by such a dual mode mobile radio telephone system, in that an operator of the system can offer customers a choice of mobile units operating in accordance with either the GSM communications apparatus or the TD/CDMA communications apparatus, and does not require mobiles to operate in dual mode, that is, to operate in accordance with the GSM system and the TD/CDMA system. This represents a cost saving to both the customers and the operator.

Although the exemplary embodiment of the present invention has been described with reference to a frequency re-use pattern of nine for the GSM system, and frequency re-use pattern of three for the TD/CDMA system, it will be appreciated that other combinations are possible. In particular, the cluster size of cells associated with frequency re-use patterns may be determined in accordance with equation 1, where R is the ratio between the cluster size associated with the GSM system and the cluster size associated with the TD/CDMA system, resulting from a bandwidth $B_{wide}$ of the TD/CDMA system and a bandwidth $B_{narrow}$ of the GSM system, where n is a scalar:

$$R = \frac{B_{wide}}{n \times B_{narrow}} \quad (1)$$

For the illustrative example of the dual mode mobile radio communications system already described, it can be seen that for this exemplary embodiment, R=3, n=1, $B_{wide}$=600 khz, and $B_{narrow}$=200 khz. As such, where the frequency re-use factor of the TD/CDMA system is three, the GSM re-use factor is nine, which is the case already described, whereas if the frequency re-use factor of the TD/CDMA, system is four, the frequency re-use factor for the GSM system will be twelve. As a further example of different cluster sizes that are possible with the dual mode mobile radio system, table 2 provides an illustration of different cluster sizes that may be used where the TD/CDMA system is provided with a bandwidth of 1.2 MHz, and correspondingly table 3 provides an illustration of different cluster sizes that may be used where the TD/CDMA system is provided with a bandwidth of 2.4 MHz. Other non-integer (scalar) values of n are also possible in a case where, a mixture of calls and sectors is used to form the frequency re-use pattern of the GSM or TD/CDMA systems. For example n may be 1.5 in the case of a bandwidth available to the TD/CDMA system of 600 kHz operating with a frequency reuse cluster size of two.

As will be appreciated by those skilled in the art various modifications may be made to the aforementioned embodiment, without departing from the scope of the present invention. In particular other combinations of mobile radio systems are envisaged, such as a wide band TDMA system in combination with a GSM system or indeed a wide band CDMA system in combination with a TD/CDMA system. Furthermore, as will be appreciated the present invention is not limited to a particular re-use factors described for the illustrative embodiment of the invention. In addition, although the illustrative embodiment has been described with reference to carriers without specifying whether these were associated with the up-link or the down-link of a frequency division duplex system, it will be appreciated that the description applies for either the uplink or the down-link, and indeed to a time division duplex system.

The present invention is subject to many variations, modifications and changes in detail. It is intended that all matter described throughout the specification and shown in the accompanying drawings be considered illustrative only. Accordingly, it is intended that the invention be limited only by the spirit and scope of the appended claims.

I claim as my invention:

1. A mobile radio telephone system comprising:

a plurality of operatively coupled base stations, said base stations having first and second radio communications apparatus which effect radio communications with at least one mobile station via at least first and second radio signals having radio frequencies which occupy a common radio frequency spectrum, wherein a first frequency re-use pattern associated with said first radio communications apparatus is at least substantially matched to a second frequency re-use pattern associated with said second radio communications apparatus; and a plurality of cells, each of said cells being associated with at least one of said base stations, wherein a cluster size associated with the first radio communications apparatus is at least substantially equal to a cluster size associated with the second radio communications apparatus scaled by a predetermined factor, to provide a match between the first and the second frequency re-use patterns associated with the first and the second communications apparatus.

2. A mobile radio telephone system according to claim 1, wherein a bandwidth occupied by said second radio signals is substantially greater than a bandwidth occupied by said first radio signals.

3. A mobile radio system as claimed in claims 2, wherein a predetermined factor is substantially equal to a ratio of the bandwidth of said second radio frequency signal compared with a bandwidth of said first radio frequency signal.

4. A mobile radio system as claimed in claim 3, wherein said predetermined factor R is calculated from the following equation;

$$R = \frac{B_{wide}}{n \times B_{narrow}}$$

where $B_{narrow}$ is the bandwidth of said second radio signal, $B_{wide}$ is the bandwidth of said first radio signals, and n is a scalar.

5. A mobile radio system as claimed in claim 1, wherein said first radio communications apparatus is a cellular radio communications system.

6. A mobile radio system as claimed in claim 4, wherein said scalar is an integer.

7. A mobile radio telephone system as claimed in claim 1, wherein said first radio communications apparatus is a cordless radio communications system.

8. A mobile radio system as claimed in claim 1, wherein said second radio communications apparatus is a code division multiple access system.

9. A mobile radio system as claimed in claim 8, wherein the code division multiple access system is a time division/code division multiple access system.

10. A mobile radio telephone system comprising:

a plurality of operatively coupled base stations, said base stations having first and second radio communications apparatus which effect radio communications with at least one mobile station via at least first and second radio signals having radio frequencies which occupy a common radio frequency spectrum; wherein a first frequency re-use pattern associated with said first radio communications apparatus is at least substantially matched to a second frequency re-use pattern associated with said second radio communications apparatus; and wherein said second radio communications apparatus comprises a means for communicating data via said second radio signal which has a different amount of co-channel interference present at a receiver of said second communications apparatus than can be tolerated by said first radio signals at a receiver of said first radio communications apparatus.

11. A mobile radio system as claimed in claim 1, further comprising:

a control unit, coupled to said base stations and arranged to control a distribution of carrier frequencies to said first and said second communications apparatus.

12. A mobile radio telephone system as claimed in claim 10, further comprising:

a control unit, coupled to said base stations and arranged to control a distribution of carrier frequencies to said first and said second communications apparatus.

13. A mobile radio telephone system according to claim 10, wherein a bandwidth occupied by said second radio signals is substantially greater than a bandwidth occupied by said first radio signals.

14. A mobile radio system as claimed in claim 13, wherein a predetermined factor is substantially equal to a ratio of the bandwidth of said second radio frequency signal compared with a bandwidth of said first radio frequency signal.

15. A mobile radio system as claimed in claim 14, wherein said predetermined factor R is calculated from the following equation;

$$R = \frac{B_{wide}}{n \times B_{narro}}$$

where $B_{narrow}$ is the bandwidth of said second radio signal, $B_{wide}$ is the bandwidth of said first radio signals, and n is a scalar.

16. A mobile radio system as claimed in claim 10, wherein said first a radio communications apparatus is a cellular radio communications system.

17. A mobile radio system as claimed in claim 15, wherein said scalar is an integer.

18. A mobile radio telephone system as claimed in claim 10, wherein said first radio communications apparatus is a cordless radio communications system.

19. A mobile radio system as claimed in claim 10, wherein said second radio communications apparatus is a code division multiple access system.

20. A mobile radio system as claimed in claim 19, wherein the code division multiple access system is a time division/code division multiple access system.

21. A mobile radio telephone system comprising:

a plurality of operatively coupled base stations, said base stations having first and second radio communications apparatus which effect radio communications with at least one mobile station via at least first and second radio signals having radio frequencies which occupy a common radio frequency spectrum; wherein a first frequency re-use pattern associated with said first radio communications apparatus is at least substantially matched to a second frequency re-use pattern associated with said second radio communications apparatus; and wherein the base stations further comprise directional antennas which divide each associated cell into a plurality of sectors, each sector being allocated to at least one different radio frequency carrier from at least one of said first and said second radio communications apparatus.

22. A method of combining first and second radio communications apparatus in a mobile radio system, comprising the steps of:

allocating carrier frequencies in accordance with a first frequency re-use pattern associated with the first radio communications apparatus to a plurality of base stations, and matching carrier frequencies in accordance with a second frequency re-use pattern associated with the second communications apparatus to the first frequency re-use pattern; and arranging a cluster size of the first frequency re-use pattern to be substantially equal to a cluster size of the second frequency re-use pattern, scaled by a predetermined factor.

23. A method of combining first and second radio communications apparatus as claimed in claim 22, wherein a bandwidth occupied by said second radio frequency signals is substantially equal to a bandwith occupied by said first radio frequencies scaled by said predetermined factor.

* * * * *